United States Patent
Harada

(10) Patent No.: US 8,040,347 B2
(45) Date of Patent: Oct. 18, 2011

(54) METHOD FOR CONSTRUCTING SURFACE OF FLUID-BODY SIMULATION BASED ON PARTICLE METHOD, PROGRAM FOR THE SAME, AND STORAGE MEDIUM FOR STORING PROGRAM

(75) Inventor: Takahiro Harada, Toride (JP)

(73) Assignee: Prometech Software, Inc., Tokyo (JP)

( * ) Notice: Subject to any disclaimer, the term of this patent is extended or adjusted under 35 U.S.C. 154(b) by 812 days.

(21) Appl. No.: 12/071,135

(22) Filed: Feb. 15, 2008

(65) Prior Publication Data

US 2009/0070080 A1 Mar. 12, 2009

(30) Foreign Application Priority Data

Sep. 11, 2007 (JP) ................. 2007-234988

(51) Int. Cl.
*G06T 11/20* (2006.01)
*G06T 15/30* (2006.01)
*G06T 17/00* (2006.01)
*G06T 17/20* (2006.01)
*G06F 7/60* (2006.01)
*G06F 17/10* (2006.01)

(52) U.S. Cl. ........ 345/420; 345/423; 345/424; 345/441; 703/2

(58) Field of Classification Search .................. 345/424, 345/420, 423, 441; 703/2
See application file for complete search history.

(56) References Cited

OTHER PUBLICATIONS

Trembilski, A., Brossler, A., "Surface-Based Efficient Cloud Visualization for Animation Applications", Journal of WSCG, 10 (2), pp. 453-460, 2002.*

Blinn, "A Generalization of Algebraic Surface Drawing," *ACM Transactions on Graphics*, vol. 1, No. 3, pp. 235-256, Jul. 1982.

Tanaka et al., "Development of a rigid-body calculation method using a particle method, and application thereof to computer graphics," *Japan Society of Mechanical Engineers, Papers of the 19th Computational Mechanics Conference*, 2006, pp. 701-702.

Müller et al., "Particle-Based Fluid Simulation for Interactive Applications," *Eurographics/SIGGRAPH Symposium on Computer Animation*, 2003.

Müller et al., "Particle-Based Fluid Simulation for Interactive Applications," Eurographics/SIGGRAPH Symposium on computer Animation, 2003, pp. 154-159 and p. 372.

Blinn, "A Generalization of Algebraic Surface Drawing," ACM Transactions on Graphics, 1982, pp. 235-256, vol. 1-No. 3.

Trepczynski, "Schnittmodellierung auf triangulierten Polygonoberflächen," Technische Universität Berlin, 2002, pp. 1-66.

* cited by examiner

*Primary Examiner* — Chante Harrison
*Assistant Examiner* — Jed-Justin Imperial
(74) *Attorney, Agent, or Firm* — Oliff & Berridge, PLC

(57) ABSTRACT

Thin films or sharp edges in a fluid body are expressed in the display of a particle-based fluid-body simulation. The surface construction method is a method applied to a method for rendering calculation results on the screen of a display device using data that are obtained by calculation of a fluid-body simulation based on a particle method executed by a CPU or the like. The method has a first stage of allocating a concentration sphere to a particle that is a calculation object and computing an implicit function curved surface, and computing a plurality of base vertices ($V^0$) for creating a fluid-body surface by the implicit function curved surface; and a second stage that is executed at least one time for adjusting a surface sharpness for each of the plurality of base vertices ($V^0$) for creating the fluid-body surface that is computed in the first stage.

4 Claims, 4 Drawing Sheets

METHOD FOR CONSTRUCTING SURFACE OF FLUID-BODY SIMULATION BASED ON PARTICLE METHOD, PROGRAM FOR THE SAME, AND STORAGE MEDIUM FOR STORING PROGRAM

BACKGROUND OF THE INVENTION

1. Field of the Invention

The present invention relates to a method for constructing a surface that is used to increase the degree of freedom of the expression or the like of a surface shape in an expression of a fluid-body simulation implemented by a particle-based calculation, to a program for the method, and to a storage medium for storing the program.

2. Description of the Related Art

A "particle-based simulation" is a simulation method for performing calculations relating to the behavior of each of a large number of particles, in which the object of the simulation is a group (aggregation) of numerous particles. "Spheres" having a constant diameter are usually used as the particles for calculation by computer. When the shape of the object is expressed by an aggregation of spheres, the degree of approximation or the spatial resolution varies depending on the method of determining the size (diameter) of the spheres. Varying the sphere diameter and varying the spatial resolution make it possible to control the calculation accuracy and the calculation speed in the computer simulation calculation.

The abovementioned particle-based simulation has been used in recent years to calculate collisions of numerous rigid bodies, and to calculate the behavior of fluids, particulate bodies, and the like, and to research simulations of collisions, flow, and the like on the screen of a computer display device. The results of this research are described in M. Tanaka et al., "Development of a rigid-body calculation method using a particle method, and application thereof to computer graphics," Japan Society of Mechanical Engineers, Papers of the 19$^{th}$ Computational Mechanics Conference, pp. 701-702, 2006, for example. Research of these simulation techniques is important for the technology that forms the foundation of computer graphics (CG).

In the calculation of a particle-based fluid-body simulation, since the particles as such express a fluid body, there is no need to perform interface tracking, and the flow of a free surface can easily be calculated. In the calculation of the surface of a fluid body, when the calculation results based on a particle method are rendered and displayed on a display screen, concentration spheres are allocated to a plurality of spheres obtained by calculation, and a curved surface of an implicit function is constructed to compute the surface of the fluid body. An example of this calculation is described in J. Blinn, "A generation of algebraic surface drawing," ACM Transactions on Graphics, 1 (3): 235-256, 1982, or in M, Muller, D. Charypar, and M. Gross, "Particle-based fluid simulation for interactive applications," In proc. Of SIGGRAPH Symposium on Computer Animation, pp. 154-159, 2003, for example. However, when the surface is calculated by such a calculation, it is difficult to express thin films or sharp edges that occur in the change state of the fluid body.

There has been a need for the ability to compute and display an expression of thin films or sharp edges in fluid body in the display of a particle-based fluid-body simulation.

SUMMARY OF THE INVENTION

In view of the abovementioned problems, an object of the present invention is to provide a surface construction method of a fluid-body simulation based on a particle method that is capable of expressing a thin film or a sharp edge in the fluid body in the display of a particle-based fluid-body simulation, to provide a program for the surface construction method, and to provide a storage medium for storing the program.

In order to achieve the abovementioned objects, the surface construction method of a fluid-body simulation based on a particle method, the program for the surface construction method, and the storage medium for storing the program according to the present invention are constituted as described below.

A first surface construction method is a method for rendering calculation results on a screen of a display device using data that are obtained by calculation of a fluid-body simulation based on a particle method that is executed by a CPU, GPU, or other computational processor, wherein the surface construction method of a fluid-body simulation based on a particle method comprises a first stage of allocating a concentration sphere to a particle that is a calculation object and computing an implicit function curved surface, and computing a plurality of base vertices ($V^0$) for creating a fluid-body surface by the implicit function curved surface; and a second stage that is executed at least one time for adjusting a surface sharpness for each of the plurality of base vertices ($V^0$) for creating the fluid-body surface that is computed in the first stage.

A second surface construction method is the abovementioned method, wherein the second stage includes a step of calculating a first vertex ($T^t$) by calculating a weighted sum of coordinates of particles present on a periphery of each vertex for each of the plurality of base vertices ($V^0$) for creating the fluid-body surface, and dividing the weighted sum by a total sum of a weight of the plurality of base vertices; and a step of calculating a second vertex ($T^{t+1}$) on the basis of an equation "$v_i^{t+1} = f(v_i^t, t_i^t, c)$" that includes a single parameter c by using each of the plurality of first vertices ($T^t$) and each of the plurality of base vertices ($V^0$).

A third surface construction method is the abovementioned method, wherein $f(v_i^t, t_i^t, c)$ of "$v_i^{t+1} = f(v_i^t, t_i^t, c)$" is "$(1-c) v_i^t + c t_i^t$."

A first surface construction program is correlated with a program for causing a computational processor to execute calculation of a fluid-body simulation based on a particle method, and execute rendering of calculation results on a screen of a display device using obtained data, and comprises furthermore causing a computer to execute a first routine of allocating a concentration sphere to a particle that is a calculation object and computing an implicit function curved surface, and computing a plurality of base vertices ($V^0$) for creating a fluid-body surface by the implicit function curved surface; and a second routine that is executed at least one time for adjusting a surface sharpness for each of the plurality of base vertices ($V^0$) for creating the fluid-body surface that is computed in the first stage.

A second surface construction program is the abovementioned surface construction program, wherein the computational processor is furthermore caused to execute in the second routine a routine of calculating a first vertex ($T^t$) by calculating a weighted sum of coordinates of particles present on a periphery of each vertex for each of the plurality of base vertices ($V^0$) for creating the fluid-body surface, and by dividing the weighted sum by a total sum of a weight of the plurality of base vertices; and a routine of calculating a second vertex ($T^{t+1}$) on the basis of an equation "$v_i^{t+1} = f(v_i^t, t_i^t, c)$" that includes a single parameter c by using each of the plurality of first vertices ($T^t$) and each of the plurality of base vertices ($V^0$).

A third surface construction program is the abovementioned program, wherein $f(v_i^t, t_i^t, c)$ of "$v_i^{t+1}=f(v_i^t, t_i^t, c)$" is "$(1-c)v_i^t+ct_i^t$."

The computer-readable storage medium according to the present invention is a storage medium for storing the surface construction program according to any of the first through third programs described above.

According to the present invention, when a fluid body is drawn on the screen of a display device by a fluid-body simulation that is based on a particle method, the sharpness of fluid-body surfaces such as thin films or sharp edges can be increased, and thin films and other fluid-body surfaces can be expressed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described hereinafter based on the accompanying drawings.

Figure 1:
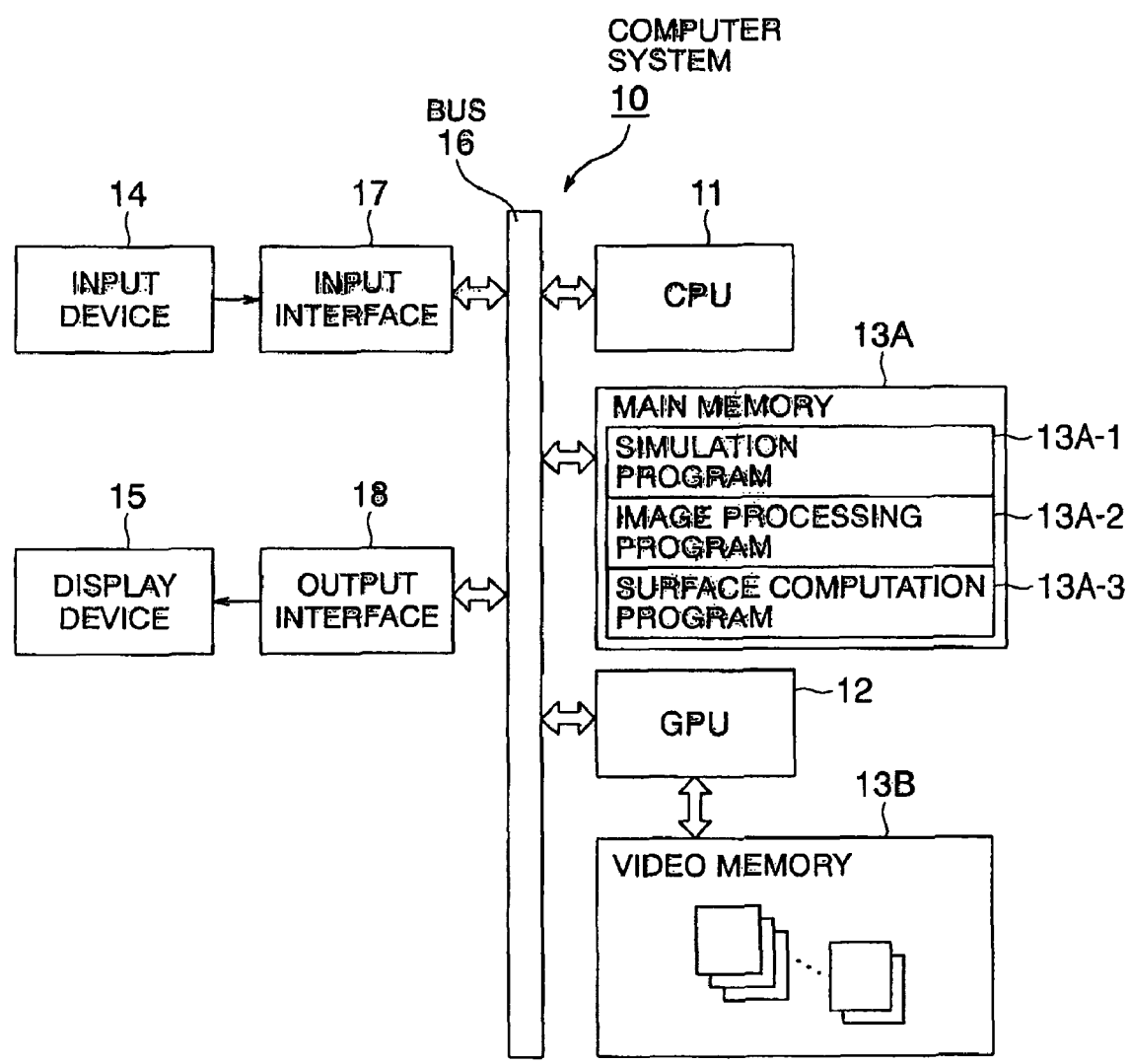
FIG. 1 is system structure diagram showing the basic structure of the computer system for implementing the surface construction method of a fluid-body simulation based on a particle method according to the present invention.

FIG. 1 shows the basic structure of the computer system for implementing the surface construction method of a fluid-body simulation according to a particle method.

The computer system 10 is configured using a PC (Personal Computer), for example, and is provided with a CPU (central computational processing device) 11 as a computational processing unit (computational processor). The CPU 11 is a common computational processor installed in a PC or the like, for example. The computer system 10 is also provided with main memory 13A as a storage device, and is provided with at least an input device 14 and a display device 15 as peripheral devices. The CPU 11, main memory 13A, input device 14, and display device 15 are connected to each other via a bus 16. The input device 14 is connected to the bus 16 via an input interface 17, and the display device 15 is connected to the bus 16 via an output interface 18.

The computer system 10 is furthermore provided with a GPU 12 as another computational processing unit, and video memory (VRAM) 13B that relates to the GPU 12. The GPU (Graphics Processing Unit) 12 is a "graphics computational processor," and executes image computational processing. The video memory 13B is directly connected to the GPU 12, and data are exchanged with the video memory 13B through the GPU 12.

A fundamental processing operation of the CPU 11 is to perform calculation of a fluid-body simulation according to a particle method on the basis of a proximate particle search program 13A-1 stored in the main memory 13A. The CPU 11 executes a common image display program 13A-2 stored in the main memory 13A, uses the data obtained by calculation of the fluid-body simulation to perform image processing, and draws (performs rendering for display) on the screen of the display device 15 using the created data. A CG image is displayed on the screen of the display device 15 on the basis of the particle-based simulation calculations.

In the present embodiment, a surface computation program 13A-3 for executing a surface construction method of a fluid-body simulation based on a particle method is furthermore provided in the main memory 13A.

In the description of the present embodiment given hereinafter, it is presupposed that calculation of a fluid-body simulation based on a particle method is performed, and that the fluid body is drawn (rendered) on the screen of the display device 15 in accordance with the calculation results of the fluid-body simulation. The free surface of the fluid body drawn on the screen on the basis of the surface computation program 13A-3 is expressed (surface-constructed) as a sharp surface having thin films or sharp edges.

Figure 2:
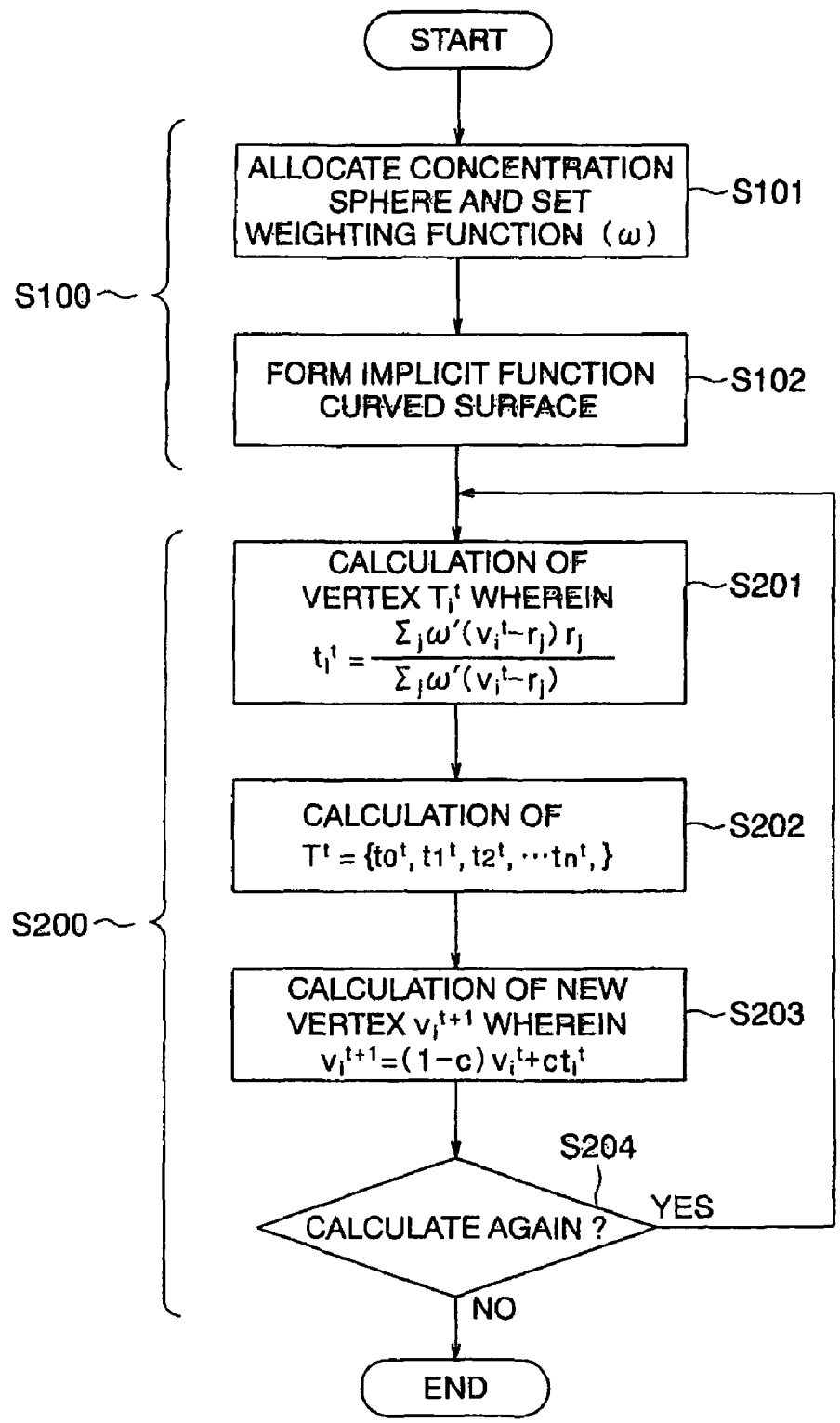
FIG. 2 is a flowchart showing the process of the method for constructing a fluid-body surface.

The surface construction method executed by the surface computation program 13A-3 will be described according to FIG. 2. FIG. 2 is a flowchart showing the process of the surface construction method executed by reading and executing the surface computation program 13A-3 from the main memory 13A by the CPU 11.

As shown in FIG. 2, the surface construction method of the present embodiment is composed of the operations according to the first stage S100, and the operations according to the second stage S200. The surface of the fluid body is constructed by the first stage S100 and the second stage S200. The first stage S100 is a stage for using concentration spheres to create vertices from particles and construct a fluid-body surface, and the second stage S200 is a stage for processing the fluid-body surface thus obtained.

The process of the first stage S100 will be described. The first stage S100 uses concentration spheres to create vertices from particles and to construct the fluid-body surface.

In the first step S101, a concentration sphere is allocated and given a certain weighting function ($\omega$) for all the numerous particles that are set for expressing the fluid body on the basis of the particle method. The term "concentration sphere" refers to an imaginary mathematical entity having a distribution characteristic that is provided in relation to an arbitrarily defined quantity centered at a coordinate value at which an object particle is present. The "weighting function" has a variation characteristic as described hereinafter, and can be arbitrarily set insofar as the weighting function has the variation characteristic.

An implicit function curved surface is then formed for each of the abovementioned numerous particles (step S102). The implicit function curved surface is constructed by calculating the summation of the concentration and weighting function allocated for the aforementioned particle to which a concentration sphere is allocated and to which a certain weighting function ($\omega$) is applied. Mathematically, the concentration value $\phi(x)$ at the coordinate x is calculated by (Formula 1) below as the sum of the weighting functions $\omega$ of all the particles. The weighting function $\omega$ is actually a function $\omega(x)$ of the coordinate x, as described hereinafter.

$$\phi(x)=\Sigma_j\omega(x-r_j) \quad \text{(Formula 1)}$$

In (Formula 1) above, $r_j$ is the coordinate of the $j^{th}$ particle. The weighting function $\omega$ uses a weighting function that has such a variation characteristic that the weight increases the closer the distance $|x-r_j|$ from the vertex to the particle j is, and the weight decreases the greater the distance is. In the actual calculation, the calculation cost is extremely high when the weight for a particle at an infinite distance from the vertex is not zero. Therefore, the weight for particles farther than a certain distance is set to zero in the weighting function used in calculation in the present embodiment. In this embodiment, the weighting function ω(x) shown in (Formula 2) below is used as an example.

$$\omega(x) = \begin{cases} \dfrac{r_e}{|x|} - 1 \\ 0 \end{cases} \quad \text{(Formula 2)}$$

In Formula 2, $0 \leq |x| < r_e$, and $r_e \leq |x|$.

In (Formula 2) above, $r_e$ is the influence radius, and the weighting function ω(x) is zero when |x| is equal to or greater than $r_e$. For coordinate x, the value of the weighting function ω(x) gradually decreases as |x| approaches the influence radius $r_e$.

The concentration value ω(x) calculated as described above constructs the surface of the fluid body at the position of a threshold value $r_0$. The positions in which the surface of the fluid body is constructed in this manner are designated as vertices, the number of vertices present is designated as n, and the vertices are indicated by (Formula 3) below as $V^0$.

$$V^0 = \{V_0^0, V_1^0, V_2^0, \ldots, V_n^0\} \quad \text{(Formula 3)}$$

As described above, in the calculation of the fluid-body simulation based on a particle method, calculation results relating to n vertices can be obtained for constructing the fluid-body surface as the calculation of the free surface of the fluid body that is drawn. The processing described above for using concentration spheres to construct a fluid-body surface from particles (the first stage S100) is a conventionally known method.

The process of the second stage S200 will next be described. The second stage S200 is a method for further processing the fluid-body surface obtained in the first stage S100 and making it possible to sharply express fluid-body surfaces such as thin films, sharp edges, or the like.

In the second stage S200, the weighted sum of the coordinates of particles that are present on the periphery of each vertex (original vertex) is calculated as shown in (Formula 4) for each of the abovementioned n vertices for constructing the fluid-body surface, and new vertices are calculated by dividing by the summation of the weights (step S201).

$$t_i^t = (\Sigma_j \omega'(v_i^t - r_j) r_j) / (\Sigma_j \omega'(v_i^t - r_j)) \quad \text{(Formula 4)}$$

In (Formula 4) above, the same weighting function as the weighting function ω is used as the weighting function ω'. As described above, the value expressed by (Formula 5) below is computed for all of the n vertices (original vertices) (step S202), and the newer vertex ($v_i^{t+1}$) indicated by (Formula 6) below is calculated through the use of the original vertices (step S203).

$$T^t = \{t_0^t, t_1^t, t_2^t, \ldots, t_n^t\} \quad \text{(Formula 5)}$$

$$v_i^{t+1} = (1-c)v_i^t + ct_i^t \quad \text{(Formula 6)}$$

In (Formula 6) above, c is a parameter having a value between 0 and 1, and the sharpness of the surface can be adjusted by adjusting this value. The normal vector at each vertex must be calculated in order to render the fluid-body surface on the screen of the display device 15 on the basis of the calculation results. Since the normal vector of the calculated vertex cannot be calculated by taking the slope of the concentration values, the normal line of the original vertex is calculated by calculating the sum of the normal lines of edges that share a vertex in the case of two dimensions, or of common planes in the case of three dimensions, and normalizing the result.

The equation used for calculating the new vertex ($v_i^{t+1}$) is not limited to (Formula 6). The general equation "$v_i^{t+1} = f(v_i^t, t_i^t, c)$" that includes the single parameter c and the repetition number t may be used, and the abovementioned equation "$v_i^{t+1} = (1-c)v_i^t + ct_i^t$" is merely an example.

The vertex $v_i^{t+2}$ can be obtained by using the vertex $v_i^{t+1}$ obtained as described above to again calculate the abovementioned (Formula 4) and (Formula 6) (step S204). Insofar as the result of the determination step S204 is YES, the surface shape of the fluid body can be made into a sharp surface shape that conforms more closely to the particle positions by repeating the operations based on steps S201 through S203 described above. Through these operations (steps S201 through S204), certain points on the surface of the fluid body converge with the weighted centers of the particle coordinates distributed in space.

Figure 3:
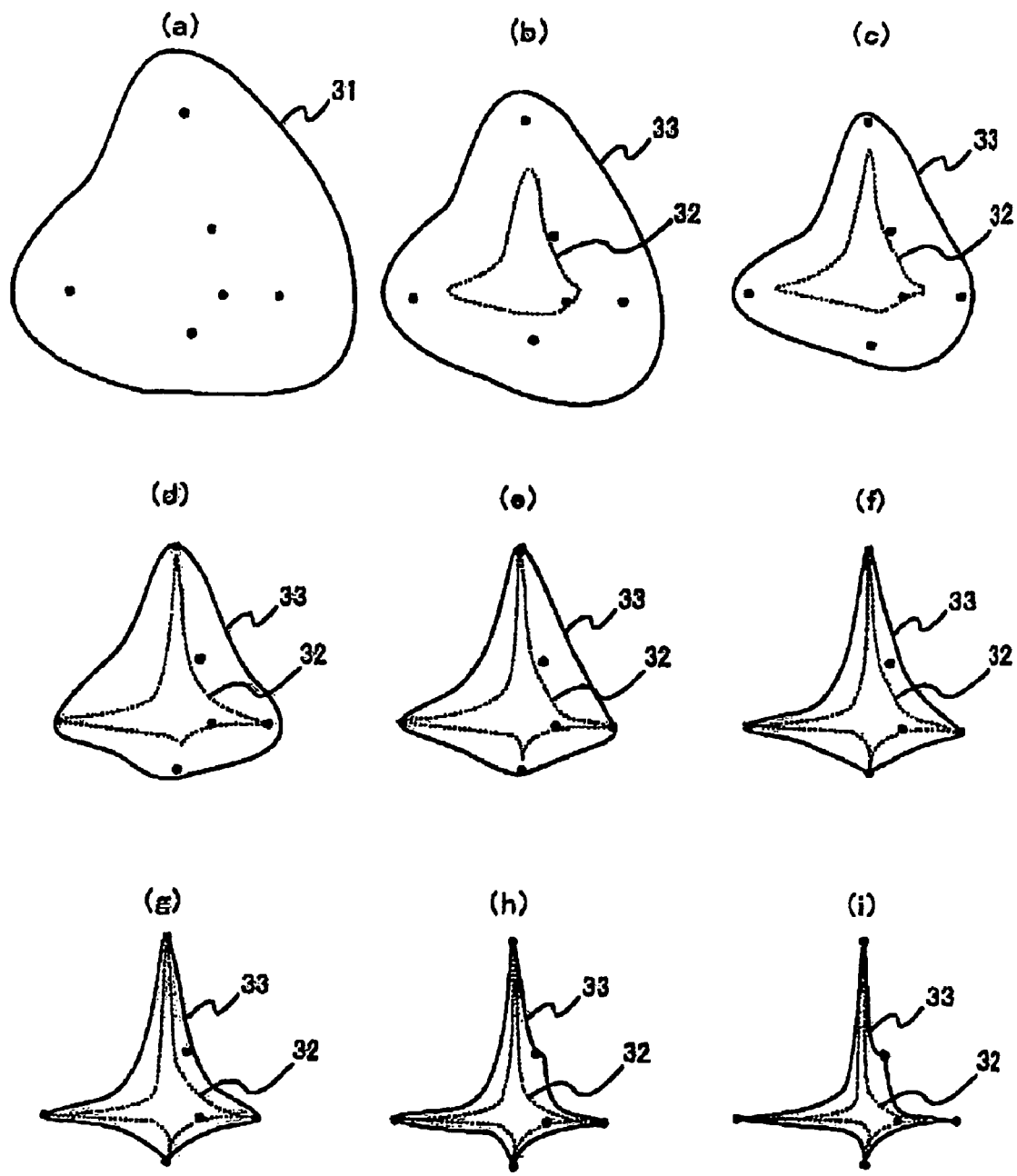
FIG. 3 is a state transition diagram showing the change in the surface state that changes based on processing for sharply expressing a fluid-body surface.

An example of the calculations in the second stage S200 for sharply expressing the fluid-body surface will next be described in terms of images with reference to FIG. 3. FIG. 3 is an example of calculation in two dimensions, and shows the change of the calculation state in the nine stages (a) through (i). The values of t in stages (b) through (i) are 1, 2, 3, 4, 5, 6, 7, and 8, respectively.

In the first stage, six particles (black points in the drawing) are arranged as an example, and the implicit function curved surface is extracted from the six particles ((a) in FIG. 3). In (a) of FIG. 3, a curve 31 is drawn in which a surface is indicated on the basis of a concentration sphere around the six particles. The curve 31 drawn by the solid line is expressed based on the aforementioned vertices ($V^0$).

In (b) and subsequent drawings in FIG. 3, a curve 32 that expresses the vertices ($T^t$) is indicated by a dashed line, and a curve 33 that expresses the vertices ($V^t$) is indicated by a solid line. For example, the surface for which t=1 is shown in (b) in the top level of FIG. 3, and the surface for which t=2 is shown in (c). In FIG. 3, t increases from (d) to (f) in the middle level, and from (g) to (i) in the bottom level. As the calculations of the second stage S200 are repeated in this manner, the fluid-body surfaces drawn by the vertices ($T^t$, $V^t$) approach the particle coordinates, and a sharp fluid-body surface can be expressed as shown in (f) through (i) in FIG. 3. In the example of FIG. 3, the value 0.3 is used as the parameter c.

As described above, the surface around the particles at the ends of the fluid body in the fluid body obtained by the calculation results of the fluid-body simulation based on the particle method is created so as to spread widely when a concentration sphere is used ((a) of FIG. 3). When the vicinity of this surface is observed, since only one particle is present in the near vicinity, the weighted center of gravity of the coordinate of the particle calculated in the surface is substantially the coordinate of the particle. By subsequently increasing t, the surface of the fluid body is made to converge on the coordinate of the particle.

In the second stage S200 described above, the shape of the fluid-body surface can be controlled by using the abovementioned parameter c and repetition number t.

Figure 4:
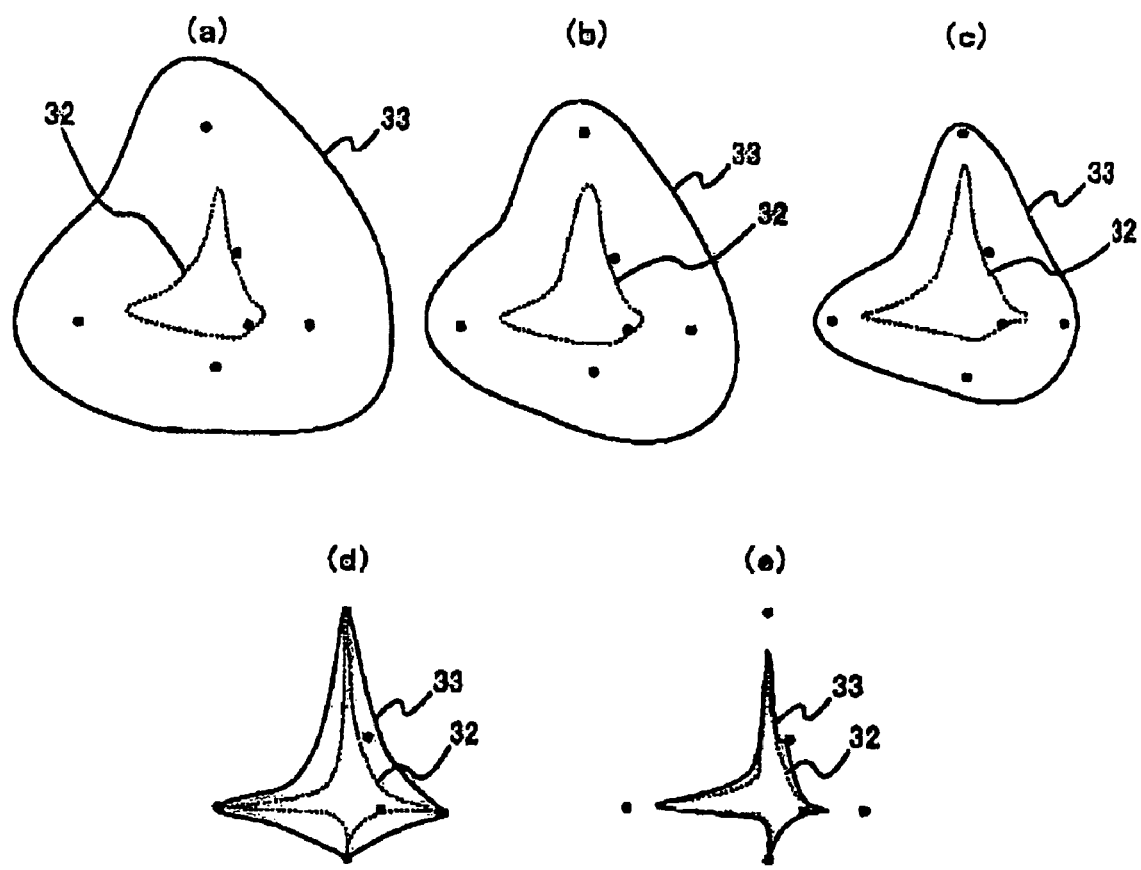
FIG. 4 is a state transition diagram showing the change in the surface state of the fluid body when the parameter c is gradually increased from zero in the fluid-body surface of the case in which t=2 (two iterations) shown in FIG. 3.

FIG. 4 shows the change in the fluid-body surface when the value of c in (Formula 6) is varied. In FIG. 4, the change of the fluid-body surface shown in (b) of FIG. 3 when t=2 (two repetitions) is shown. In FIG. 4, (a) shows the surface when c=0, and change does not occur. Specifically, this surface shows the surface when the implicit function curved surface is extracted. In FIG. 4, the value of c increases from (a) to (e), and $V^t$ approaches $T^t$. The curve 32 indicated by the dashed line that expresses the vertices ($T^t$), and the curve 33 indicated by the solid line that expresses the vertices ($V^t$) are also drawn in FIG. 4.

As is apparent from the descriptions of FIGS. 3 and 4, various fluid-body surfaces can be constructed by varying the repetition number t or the parameter c. The shape of the surface of a fluid body can only be changed by varying the weighting function in a surface construction method that uses only a concentration sphere according to the conventional method. In contrast, in the method for constructing a fluid-body surface according to the present invention, various fluid-body surfaces can be constructed by adjusting the repetition number t and the parameter c, and thin films, sharp edges, and other sharp surfaces in particular can be expressed.

A two-dimensional example was used in the description of the aforementioned embodiment, but a sharp fluid-body surface can be expressed by the same method even in the case of three dimensions.

The method for constructing a fluid-body surface on the basis of calculation results of a fluid-body simulation based on a particle method is implemented primarily through the execution of the surface computation program 13A-3 shown in FIG. 1 by a GPU 12 or the like. The surface computation program 13A-3 is stored as such in a CDROM or other storage medium, and can be configured as a standalone program product.

What is claimed is:

1. A method for rendering calculation results on a screen of a display device using data that are obtained by calculation of a fluid-body simulation based on a particle method that is executed by a computational processor, wherein the surface construction method of a fluid-body simulation based on a particle method comprises:
    a first stage of allocating a concentration sphere to a particle that is a calculation object and computing an implicit function curved surface, and computing a plurality of base vertices ($V^0$) for creating a fluid-body surface by the implicit function curved surface; and
    a second stage that is executed at least one time for adjusting a surface sharpness for each of the plurality of base vertices ($V^0$) for creating the fluid-body surface that is computed in the first stage;
    wherein the second stage includes:
    a step of calculating a first vertex ($T^t$) by calculating a weighted sum of coordinates of particles present on a periphery of each vertex for each of the plurality of base vertices ($V^0$) for creating the fluid-body surface, and dividing the weighted sum by a total sum of a weight of the plurality of base vertices; and
    a step of calculating a second vertex ($T^{t+1}$) on the basis of an equation "$v_i^{t+1} = f(v_i^t, t_i^t, c)$" that includes a single parameter c by using each of the plurality of first vertices ($T^t$) and each of the plurality of base vertices ($V^0$).

2. The method of claim 1, wherein $f(v_i^t, t_i^t, c)$ of "$v_i^{t+1} = f(v_i^t, t_i^t, c)$" is "$(1-c)v_i^t + ct_i^t$".

3. A non-transitory computer-readable storage medium for storing a surface construction program of a fluid-body simulation based on a particle method that is correlated with a program for causing a computational processor to execute calculation of a fluid-body simulation based on a particle method, and execute rendering of calculation results on a screen of a display device using obtained data, wherein the program causes a computer to execute routines comprising:
    a first routine of allocating a concentration sphere to a particle that is a calculation object and computing an implicit function curved surface, and computing a plurality of base vertices ($V^0$) for creating a fluid-body surface by the implicit function curved surface; and
    a second routine that is executed at least one time for adjusting a surface sharpness for each of the plurality of base vertices ($V^0$) for creating the fluid-body surface that is computed in the first stage, wherein the program causes the computational processor to furthermore execute in the second routine:
    a routine of calculating a first vertex ($T^t$) by calculating a weighted sum of coordinates of particles present on a periphery of each vertex for each of the plurality of base vertices ($V^0$) for creating the fluid-body surface, and dividing the weighted sum by a total sum of a weight of the plurality of base vertices; and
    a routine of calculating a second vertex ($T^{t+1}$) on the basis of an equation "$v_i^{t+1} = f(v_i^t, t_i^t, c)$" that includes a single parameter c by using each of the plurality of first vertices ($T^t$) and each of the plurality of base vertices ($V^0$).

4. The medium of claim 3 for storing a surface construction program of a fluid-body simulation based on a particle method, wherein $f(v_i^t, t_i^t, c)$ of "$v_i^{t+1} = f(v_i^t, t_i^t, c)$" is "$(1-c)v_i^t + ct_i^t$".

* * * * *